Patented Feb. 25, 1941

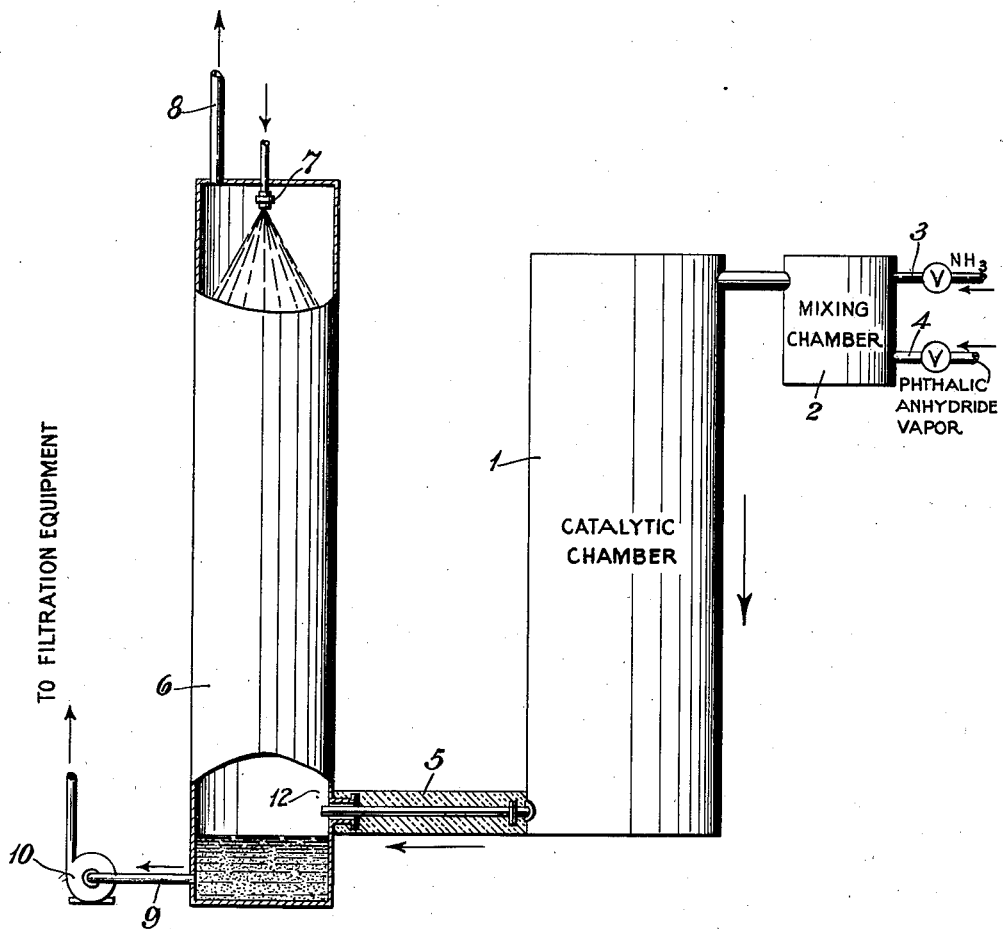

2,232,836

UNITED STATES PATENT OFFICE 2,232,836

MANUFACTURE OF PHTHALONITRILE

Harold George Bowlus, Wilmington, Del., assignor to E. I. du Pont de Nemours & Company, Wilmington, Del., a corporation of Delaware Application August 31, 1939, Serial No. 292,771

3 Claims. (Cl. 260—465)

This invention relates to the manufacture of phthalonitrile. More particularly this invention deals with the phase of recovering phthalonitrile from the reaction in the catalytic synthesis thereof, and has as its object to provide a process for effecting recovery efficiently with the obtainment of a product of high degree of purity. Additional objects of this invention will become apparent as the description proceeds.

The catalytic synthesis of phthalonitrile is a process of relatively recent development. It was invented and first described by Linstead and Lowe in U. S. Patent No. 2,054,088. In its essentials, the process consists of passing vapors of phthalic anhydride, phthalimide, phthalic acid monoamide or phthalic diamide, jointly with ammonia over a catalyst, such as alumina, silica or thoria, at a temperature between 300° and 550° C.

It has been found that the product of reaction contains, beside the described phthalonitrile, also considerable quantities of phthalimide and benzonitrile, which may be considered as residual products, intermediate products or by-products of the reaction. The recovery of the product as described in the patent consisted of condensing the entire gaseous reaction product by cooling the same in a large receiver. The solid condensate is then broken up and stirred with caustic soda solution to remove phthalimide and other alkali-soluble by-products. After filtering and washing the residual mass there remains almost pure phthalonitrile.

I have found, however, in continued practice of this process, that the phthalonitrile obtained is still contaminated to some extent. Its color is generally a greenish or a yellowish-white, and it smells strongly of almonds, which is the characteristic odor of benzonitrile. Evidently, the effect is due to occlusion of benzonitrile in the matted crystalline mass formed when the phthalonitrile is condensed by the above method, which occluded benzonitrile does not wash out completely upon breaking up of the mass. The melting point, which has been indicated as varying between 138° and 140° C., also indicates that the product is to a certain extent contaminated with impurities.

Now, according to my present invention, phthalonitrile is recovered in the form of a fluffy mass consisting of very fine crystals of excellent purity. The color of the mass is pure white; there is no odor of almonds; and the crystals solidify sharply at about 139.5° C. Such a high degree of purity is very desirable in a commercial product, because it would be uneconomical to subject a product which is used in large quantities to special recrystallization or purification treatments to raise its freezing point from 138° to 139.5° C.

According to my invention, the reaction mass is condensed, not by mere cooling in a receiver, but by subjecting it to a spray of cool water, say at about 1 to 3° C. The effect is first of all that the product is obtained in the form of very fine crystals, apparently due to the rapid rate of condensation, and secondly, that the water spray absorbs the excess ammonia forming ammonium hydroxide which dissolves the benzonitrile by-product and converts any residual or by-product phthalimide into alkali-soluble by-products. The net effect is that all the impurities and by-products of the reaction are captured in the aqueous phase while the phthalonitrile separates out in the form of fine crystals which are easy to separate from the ammoniacal solution and to wash free of it.

In the accompanying drawing, which forms an integral part of this disclosure, I have shown my preferred layout of apparatus for practicing this invention.

In this drawing, 1 is the catalytic chamber receiving a mixture of ammonia and, say, phthalic anhydride vapors from the mixing chamber 2, having the supply pipes 3, 4. The gases enter the catalytic chamber from the top and pass downwardly through the catalytic mass into outlet 5, which is a short pipe, lagged for heat insulation, leading into the bottom of condensing tower 6, which is preferably made of aluminum, stainless steel, enamel or any other material which is not readily attacked by aqueous ammonia. Here the reaction gases, after clearing the little baffle or eave 12, encounter the water spray from nozzle 7 and are cooled and condensed in the manner aforesaid. The phthalonitrile condenses into fine crystals which settle to the bottom of the tower and are covered by the aqueous ammoniacal solution of the various products. An outlet pipe 9 and pump 10 are used from time to time to draw off this mixture, from which the phthalonitrile is separated by filtration and washing with cold or warm water. A vent 8 at the top of the tower serves as an outlet for any gases escaping condensation.

The reaction gases pass through the pipe 5 at a velocity not less than 3 to 5 feet per second, and the spray they encounter is so regulated that the temperature of the slurry at the bottom of the tower is not over 25° C. Care is also taken to maintain in the slurry sufficient water to provide for easy pumping. A ratio of about 10 parts phthalonitrile per 100 parts of aqueous ammonia gives satisfactory results.

I am aware that spray towers are common in chemical industry for cooling gaseous reaction products. But that the product obtained would thereby be purified and improved as to crystalline structure is an effect which was not to be foreseen from the hitherto known art on the subject, and which contributes materially to the practical value of the product when manufactured on a commercial scale. Furthermore, in my improved process, the recovery and purification are consolidated into one step, whereas in the prior process of the art it was necessary to break up the solid crystalline mass of condensed phthalonitrile and subject it to extraction with caustic soda solution. Finally, I save the caustic soda needed in this step, for in my process the excess ammonia in the reaction mass itself combines with the water spray to give the requisite alkaline solution for solubilizing the phthalimide.

I claim:

1. A process for recovering phthalonitrile in the catalytic synthesis thereof in vapor-phase, which comprises passing the gaseous reaction mass into a tower; subjecting it there to the action of a water-spray whereby the phthalonitrile is condensed out in the form of crystals while the by-product impurities are absorbed in the aqueous solution formed by the collected spray; and finally separating the solid phthalonitrile from the said aqueous solution.

2. In the process of manufacturing phthalonitrile by catalytic reaction of ammonia with a compound of the group consisting of phthalic anhydride, phthalimide, phthalic acid monoamide and phthalic diamide, the improvement which comprises passing the reaction gases into a tower containing an aqueous spray whereby to solidify the phthalonitrile in the form of fine crystals while simultaneously absorbing the by-products of the reaction in the water spray to form an aqueous solution thereof.

3. In the process of manufacturing phthalonitrile by catalytic reaction of an excess of ammonia with a compound of the group consisting of phthalic anhydride, phthalimide, phthalic acid monoamide and phthalic diamide, the improvement which consists of treating the gaseous reaction products with a water spray at a temperature of about 1 to 3° C., whereby to convert the condensible portion of the reaction gases into an ammoniacal aqueous slurry, and then separating the solid phthalonitrile from the aqueous phase of the slurry.

HAROLD GEORGE BOWLUS.